(12) United States Patent
Hsu

(10) Patent No.: US 7,375,295 B2
(45) Date of Patent: May 20, 2008

(54) COLLAPSIBLE KEYBOARD

(75) Inventor: Chien-Shih Hsu, Taipei (TW)

(73) Assignee: Darfon Electronics Corp., Taoyuan (TW)

( * ) Notice: Subject to any disclaimer, the term of this patent is extended or adjusted under 35 U.S.C. 154(b) by 289 days.

(21) Appl. No.: 11/091,838

(22) Filed: Mar. 28, 2005

(65) Prior Publication Data
US 2005/0224320 A1    Oct. 13, 2005

(30) Foreign Application Priority Data
Apr. 9, 2004    (TW) ............................... 93109866 A

(51) Int. Cl.
*H01H 9/00* (2006.01)
(52) U.S. Cl. .................... 200/5 A; 200/4; 345/168; 341/22
(58) Field of Classification Search ............... 200/5 A, 200/4, 1 R, 341–345; 345/168–169; 341/22–24
See application file for complete search history.

(56) References Cited

U.S. PATENT DOCUMENTS 3,940,758 A * 2/1976 Margolin .................... 345/169
6,198,053 B1 * 3/2001 Chou ........................ 200/5 A
6,552,281 B2 * 4/2003 Katakami et al. .......... 200/5 A
6,734,809 B1 * 5/2004 Olodort et al. ............... 341/22
6,924,788 B2 * 8/2005 Hsu et al. ................... 345/168
2004/0104897 A1 * 6/2004 Mochizuki et al. ......... 345/168
2005/0017953 A1 * 1/2005 Pekka ........................ 345/169

OTHER PUBLICATIONS

WO 03/054672 Pekka Jul. 3, 2003.*

* cited by examiner

*Primary Examiner*—K. Richard Lee
(74) *Attorney, Agent, or Firm*—Quintero Law Office

(57) ABSTRACT

A collapsible keyboard comprises a first key assembly, a second key assembly rotatably connected to the first key assembly and a third key assembly rotatably connected to the second key assembly. The first key assembly is located between the second and third key assemblies when the collapsible keyboard is in a collapsed mode, and the first key assembly, the second and third key assemblies are substantially located on the same level when the collapsible keyboard is in an operating mode.

19 Claims, 12 Drawing Sheets

COLLAPSIBLE KEYBOARD

BACKGROUND

The invention relates to a keyboard, and in particular to a collapsible keyboard.

FIG. 1 is a schematic view of a conventional bi-fold keyboard 10. The keyboard 10 comprises a left key part 12, a right key part 14, a shaft 16 and a bracket 18 connected to the left key part 12. The left key part 12 is pivoted to the right key part 14 via the shaft 16. When the left key part 12 and the right key part 14 are folded together via the shaft 16 into a received mode, the size of the folded keyboard 10 is only reduced by half.

The bracket 18 connected to the left key part 12 (or the right key part 14) serves as a support for a portable electronic device (not shown), e.g. Personal Digital Assistant (PDA). Typically, the electronic device supported by the bracket 18 must be moved to a central region 18' of the keyboard 10 to be viewable. It is not easy, however, to position the bracket 18 on the center of the unfolded keyboard 10.

FIG. 2 is another schematic view of a conventional quad-fold collapsible keyboard 20. The keyboard 20, comprising a first part 22a, a second part 22b, a third part 22c and a fourth part 22d can be folded by the method depicted in FIG. 1B. The folded keyboard 20 is very thick. Several keys 24 between the second part 22b and the third part 22c are, however, outwardly projected and easily damaged when the keyboard 20 is folded. Thus, a space key 24 of the keyboard 20 must be divided into two sections to respectively locate on the second part 22b and the third part 22c. This results in inferior user sensitivity when operating the keyboard 20.

SUMMARY

The invention provides a collapsible keyboard with a thin profile that can be conveniently carried and stored. A collapsible keyboard comprises a first key assembly, a second key assembly rotatably connected to the first key assembly, and a third key assembly rotatably connected to the second key assembly. The first key assembly is located between the second and third key assemblies when in a collapsed mode. The first, second and third key assemblies are substantially located on the same level when in an operating mode.

In the preferred embodiments, the first key assembly is on the left side of the second key assembly. When the collapsible keyboard is in the collapsed mode, the keys of the first key assembly face the keys of the second key assembly, and the first hook is engaged with the first connecting portion for positioning the first key assembly when in the collapsed mode.

The first key assembly comprises a first protrusion and a first recess and the second key assembly comprises a second protrusion and a second recess. When the collapsible keyboard is in an operating mode, the first key assembly and the second key assembly are substantially located on the same level, wherein the first protrusion is fitted in the second recess and the second protrusion is fitted in the first recess, to prevent mutual movement between the first key assembly and the second key assembly.

The collapsible keyboard of the invention further comprises a connecting part connecting to the first key assembly and the second key assembly. The connecting part comprises a first rotation shaft pivoted to the first key assembly and a second shaft pivoted to the second key assembly and spaced apart from the first rotation shaft. Further, the connecting part comprises a second hook and the third key assembly comprises a second connecting portion. The second hook is engaged with the second connecting portion for positioning the third key assembly when in the collapsed mode.

In the preferred embodiments, the collapsible keyboard of the invention further comprises a linkage respectively pivoted to the second and third key assemblies, a first side plate pivoted to the second key assembly and a second side plate respectively pivoted to the third key assembly and the first side plate.

The second key assembly comprises a third shaft pivoted to an end of the linkage and a fourth shaft pivoted to the first side plate. The third key assembly comprises a fifth shaft pivoted to an end of the linkage and a sixth shaft pivoted to the second side plate. The second key assembly, the third key assembly, the linkage, the first side plate and the second side plate function as a five-linkage mechanism.

When the collapsible keyboard is in the operating mode, the third shaft and the fourth shaft are respectively located on different levels, and the fifth shaft and the sixth shaft are respectively located on different levels, and the first side plate and the second side plate are substantially parallel, and the second side plate is enclosed by the third key assembly and the first side plate. When in the collapsed mode, the first side plate is substantially perpendicular to the second side plate In the preferred embodiments, the first key assembly comprises a first edge irregularly formed by the first keys and the second key assembly comprises a second edge irregularly formed by the second keys and complementary to the second edge, wherein the first keys of the first edge alternately correspond to the second keys of the second edge. The second key assembly comprises a third edge irregularly formed by the second keys and the third key assembly comprises a fourth edge irregularly formed by the third keys and complementary to the third edge, wherein the keys of the third edge alternately correspond to the third keys of the fourth edge.

An embodiment of a collapsible keyboard comprises a first key assembly, a second key assembly rotatably connected to the first key assembly, and a third key assembly rotatably connected to the second key assembly. The width of the first key assembly is less than the width of the third key assembly, and the first key assembly is located between the second and third key assemblies when the collapsible keyboard is in a collapsed mode.

Another collapsible keyboard of the invention comprises a first key assembly comprising a first protrusion and a first recess and a second key assembly rotatably connected to the first key assembly and comprising a second protrusion and a second recess. When the collapsible keyboard is in an operating mode, the first key assembly and the second key assembly are substantially located on the same level, and the first protrusion is fitted in the second recess and the second protrusion is fitted in the first recess.

The tri-fold collapsible keyboard of the invention is much thinner and simpler to operate than the prior quad-fold keyboard and easier to carry and store. The keyboard is collapsed by folding the left and right key assemblies, i.e., the first and third key assemblies, to the center assembly, i.e., the second key assembly, to prevent dust accumulation and prevent damage to the keys.

Further, the width of the first key assembly is less than that of the third key assembly. Thus, the space key can be located in the center of the keyboard, i.e., the second key assembly of the keyboard, eliminating the need for division of the space key into two sections located on different key assemblies, respectively.

DESCRIPTION OF THE DRAWINGS

The present invention can be more fully understood by reading the subsequent detailed description and examples with references made to the accompanying drawings, wherein.

DETAILED DESCRIPTION

Figure 1:
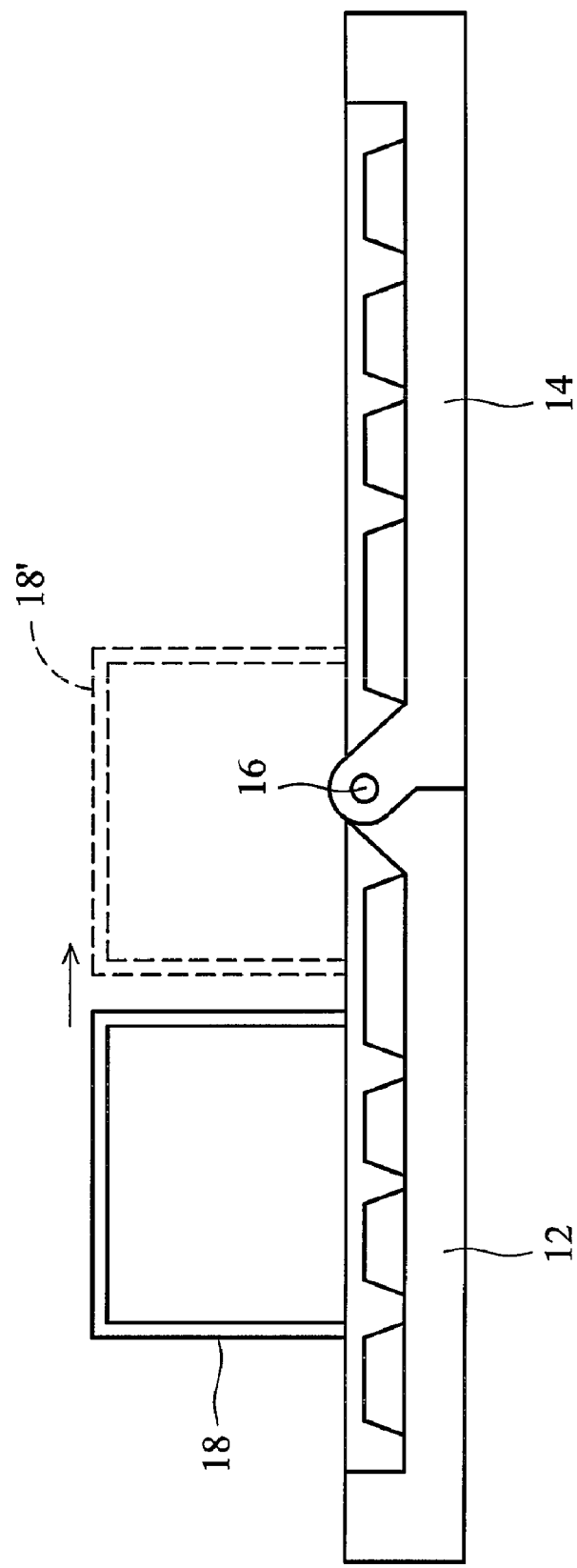
FIG. 1 is a schematic view of a conventional collapsible keyboard.
Figure 2:
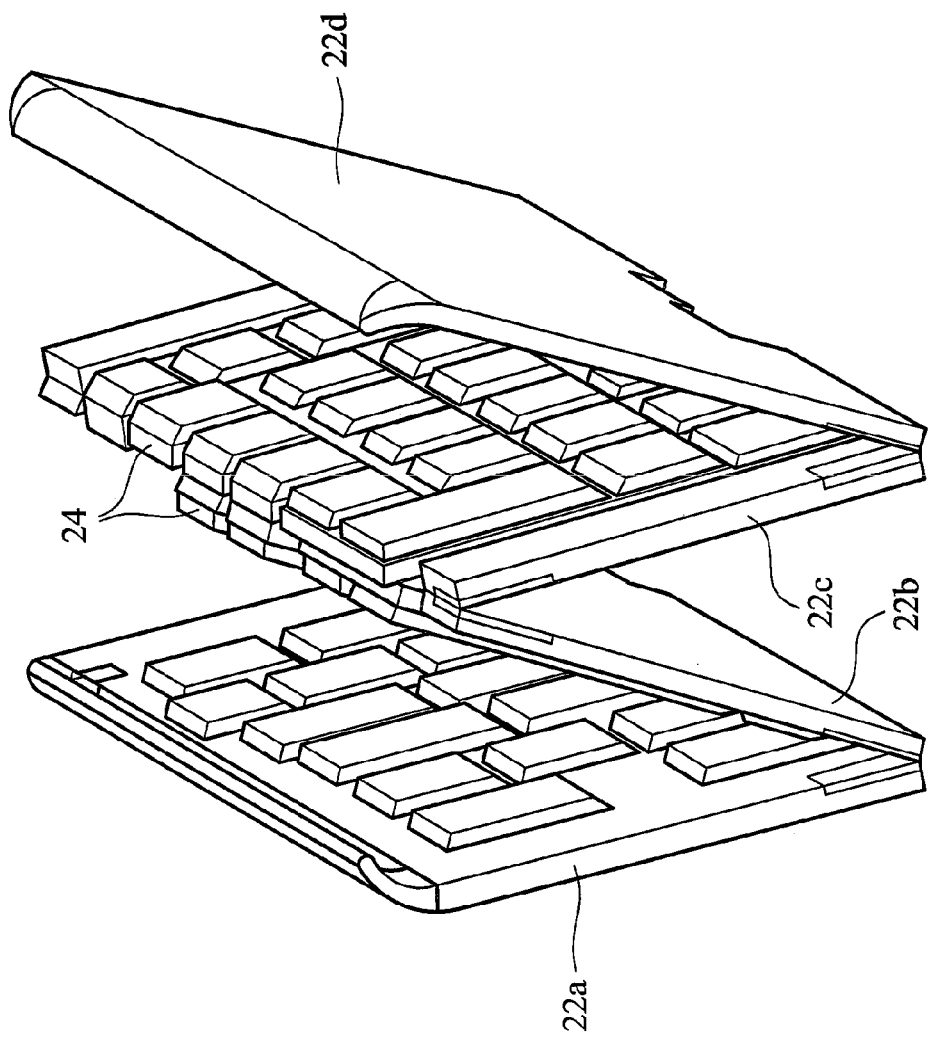
FIG. 2 is another schematic view of a conventional collapsible keyboard.
Figure 3:
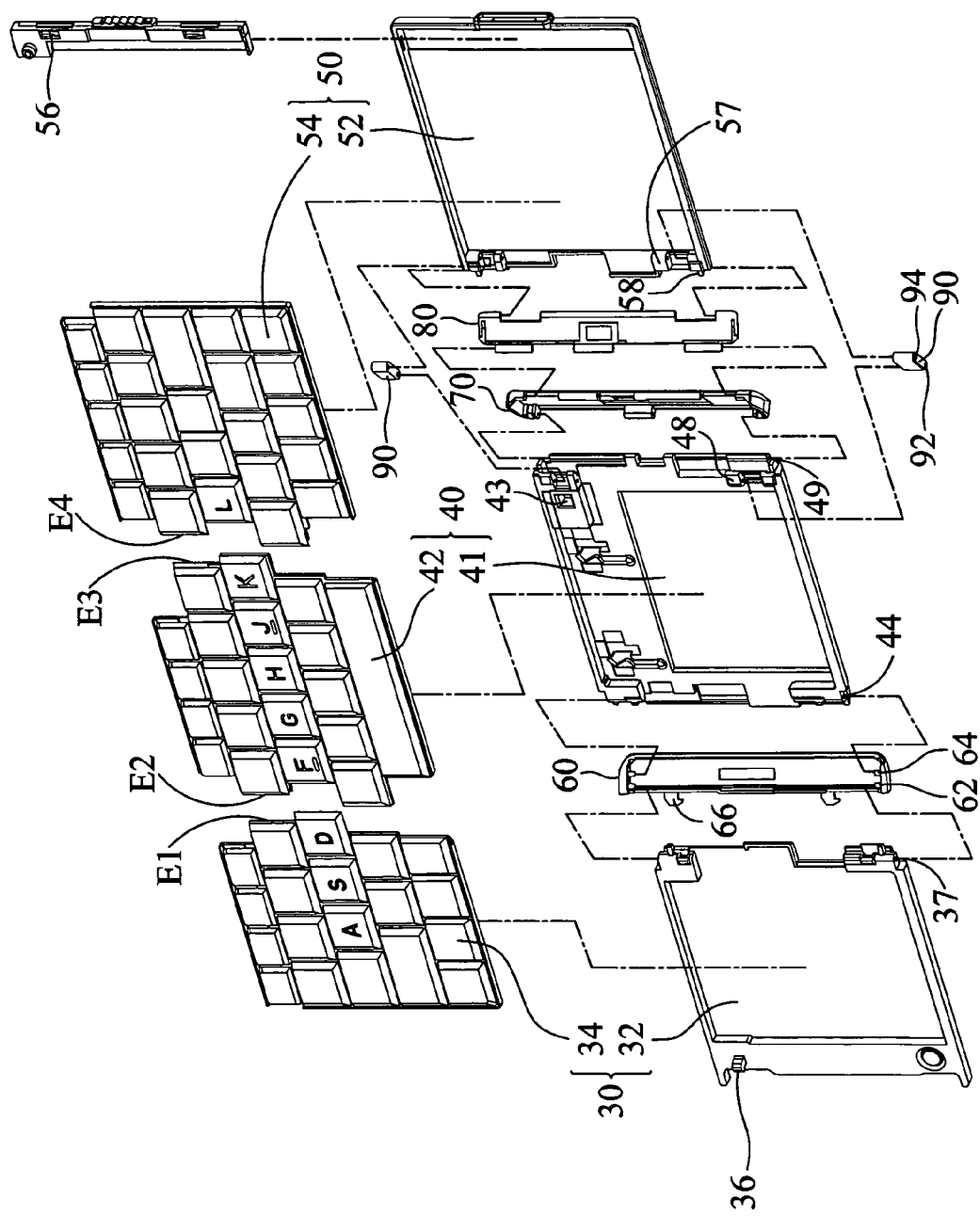
FIG. 3 is an exploded view of a collapsible keyboard of the invention.
Figure 4A:
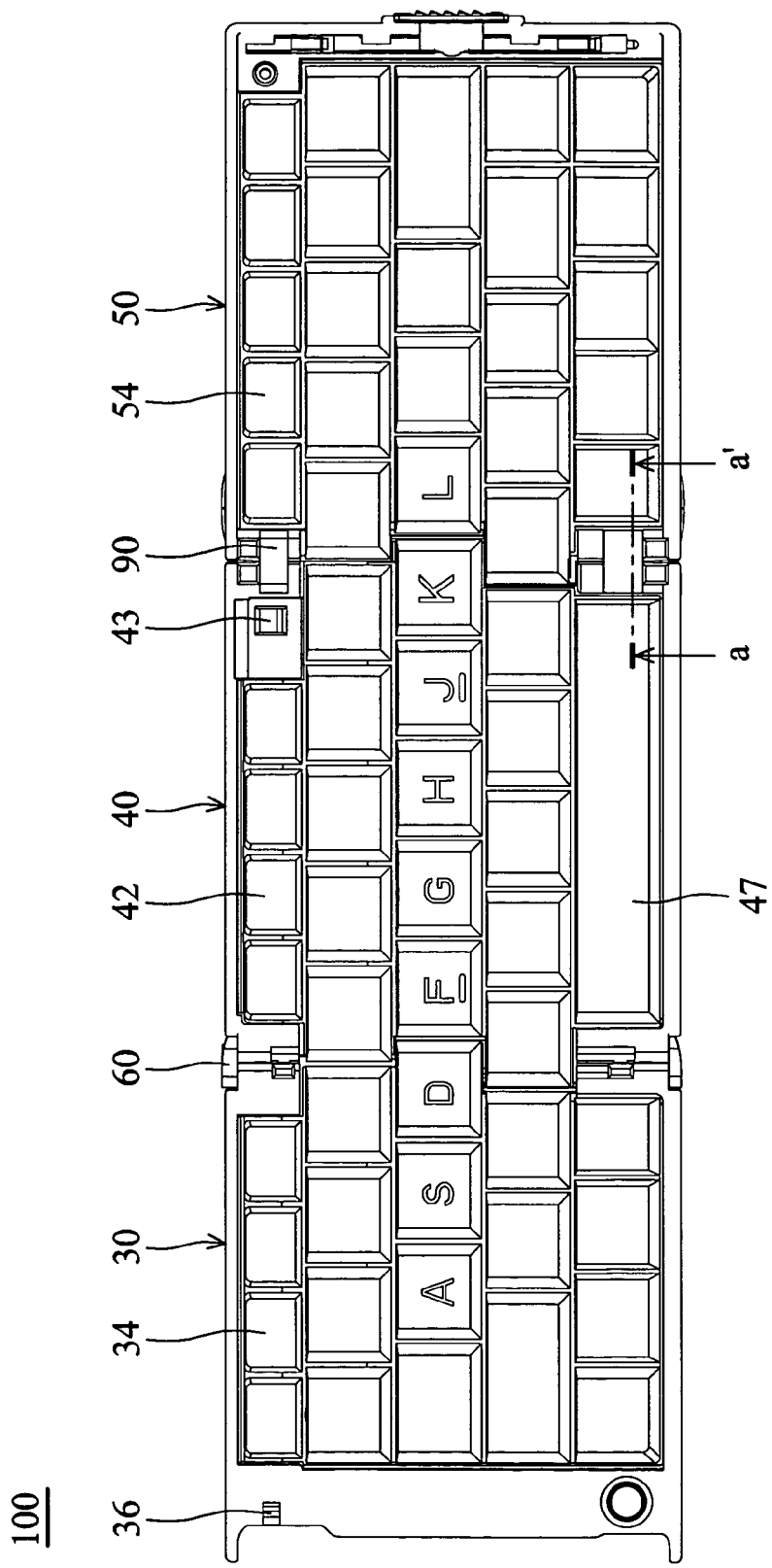
FIG. 4A is a top view of the collapsible keyboard of the invention in an operating mode.

FIG. 3 is an exploded view of a collapsible keyboard of the invention and FIG. 4A is a top view of the collapsible keyboard in an operating mode. The collapsible keyboard 100 is a tri-fold keyboard, comprising a first key assembly 30, a second key assembly 40 rotatably connected to the left side of the first key assembly 30, and a third key assembly 50 rotatably connected to the right side of the second key assembly 40.

The first key assembly 30 comprises a first housing 32 and a plurality of first keys 34 disposed on the first housing 32. The second key assembly 40 comprises a second housing 41 and a plurality of second keys 42 disposed on the housing 41. The third key assembly 50 comprises a third housing 52 and a plurality of third keys 54 disposed on the housing 52.

The first key assembly 30 comprises a first edge E1 irregularly formed by the first keys 34. The second key assembly 40 further comprises a second edge E2 irregularly formed by the second keys 42 and complementary to the second edge E2. The first keys 34 of the first edge E1 alternately correspond to the second keys 42 of the second edge E2. In FIG. 4A, the keyboard 100 is deployed as a standard keyboard.

In FIG. 3, the keyboard 100 further comprises a connecting part 60, a first side plate 70, a second side plate 80 and a linkage 90.

The connecting part 60 connected to the first key assembly 30. The second key assembly 40 comprises a first rotation shaft 62 pivoted to the first key assembly 30 and a second shaft 64 pivoted to the second key assembly 40 spaced apart from the first rotation shaft 62. The first and second rotation shafts 62 and 64 of the connecting part 60 are respectively pivoted to a through hole 37 of the first housing 32 and a through hole 44 of the second housing 41. Thus, the first key assembly 30 is movable with respect to the second key assembly 40.

The second key assembly 40 comprises a third shaft 48 pivoted to a through hole 92 located at an end of the linkage 90 and a fourth shaft 49 pivoted to the first side plate 70. The third key assembly 50 comprises a fifth shaft 57 pivoted to a through hole 94 located at another end of the linkage 90 and a sixth shaft 58. Both ends of the second side plate 80 are respectively pivoted to the first side plate 70 and the sixth shaft 58 of the third key assembly 50. The second key assembly 40, the third key assembly 50, the linkage 90, the first side plate 70 and the second side plate 80 comprise a five-linkage mechanism for rotating the third key assembly 50 with respect to the second key assembly 40.

Figure 4B:
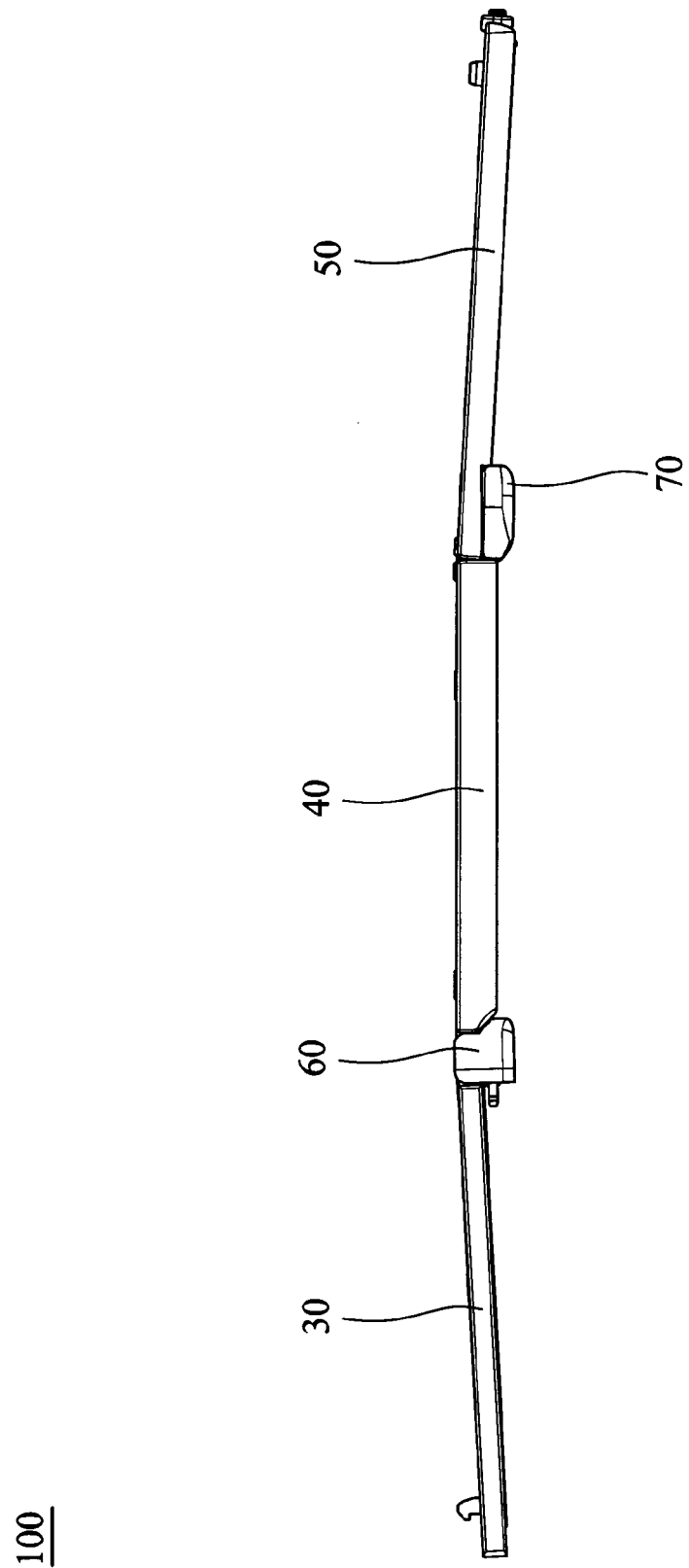
FIG. 4B is a side view of the collapsible keyboard of the invention in the operating mode.

FIG. 4B is a side view of the keyboard 100 of FIG. 4A. When the unfolded keyboard 100 is in the operating mode on a table (not shown), the left and right sides of the keyboard 100, the connecting part 60 and the first side plate 70 are four supports, and the first key assembly 30, the second key assembly 40 and the third key assembly 50 are substantially located on a horizontal level.

Figure 4C:
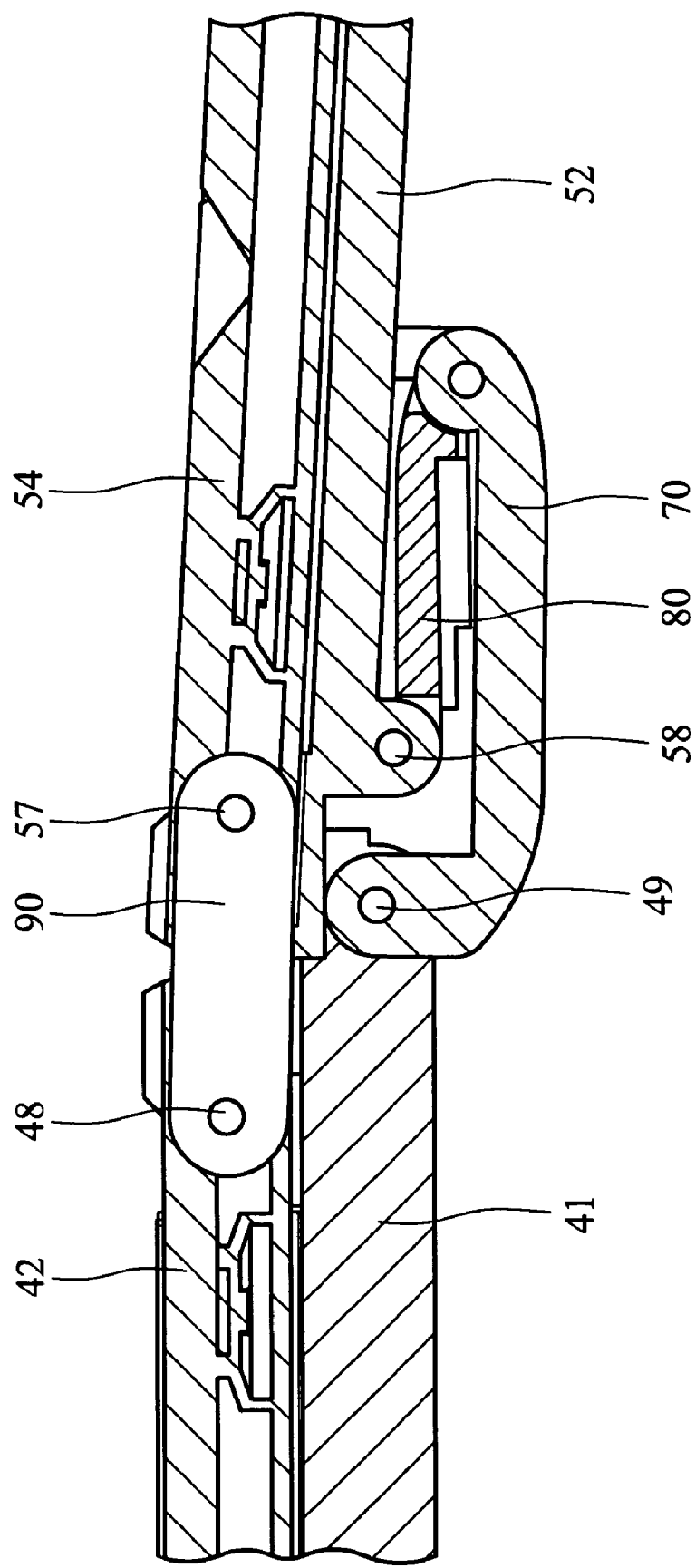
FIG. 4C is a sectional view of the collapsible keyboard along line (a-a') of FIG. 4A.

FIG. 4C is a sectional view of the collapsible keyboard along line a-a' of FIG. 4A. When the keyboard 100 is unfolded, the third and fourth shafts 48 and 49 of the second housing 41 are respectively located independently, and the fifth and sixth shafts 57 and 58 of the third housing 52 are respectively located at an individual level. The linkage 90 is horizontally connected to the third and fifth shafts 48 and 57, and the first and second side plates 70 and 80 are parallel. The second side plate 80, enclosed by the third key assembly 50 and the first side plate 70, is located at the bottom of the keyboard 100. The second housing 41 is a flange extending from fourth shaft 49 rightward to the third housing 52 horizontally stabilizing the third key assembly 50.

Figure 5A:
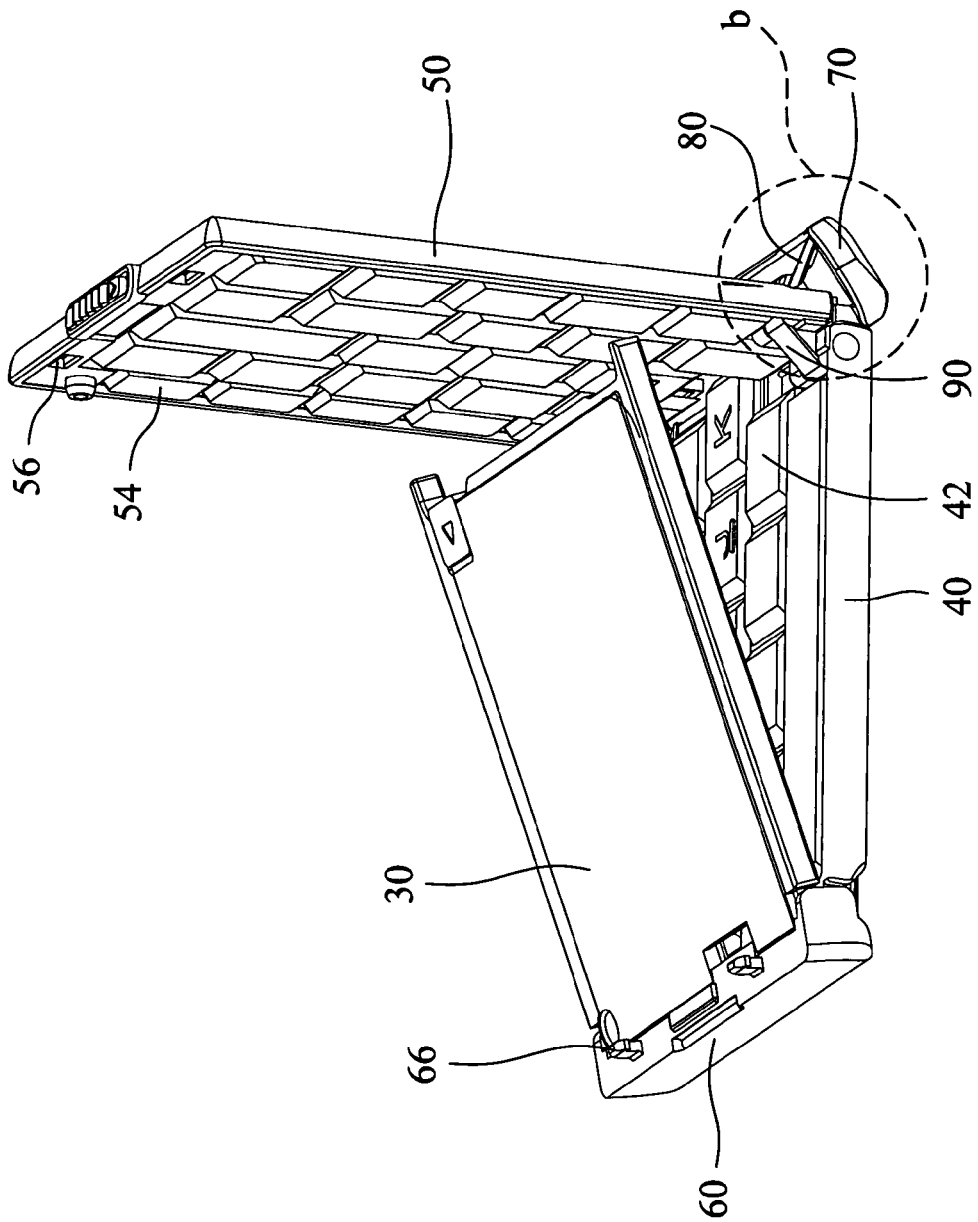
FIG. 5A is a perspective view of the collapsible keyboard of the invention in a collapsed mode.

Referring to FIGS. 4 and 5A, FIG. 5A is a perspective view of the keyboard 100 in a collapsed mode. In conventional collapsible keyboards, it can be found that most function keys are located on the right side of the keyboard while the "F", "J" and space keys are closer to the left side. Thus, the space key must be divided into two sections and located on different key assemblies, respectively. In this embodiment, the first key assembly 30 located on the left side of the keyboard 100 is thinner than the third key assembly 50, to accommodate the "F" key in the second key assembly 40. By folding the first key assembly 30 located on the left side of the keyboard 100 toward the second key assembly 40 located in the center of the keyboard 100, the first keys 34 of the first key assembly 30 face the second keys 42 of the second key assembly 40, and the first connecting portion 43 in FIG. 4A of the second key assembly 40 can be locked by the first hook 36 of the first key assembly 30, and thus the first key assembly 30 can be securely fixed.

Figure 5B:
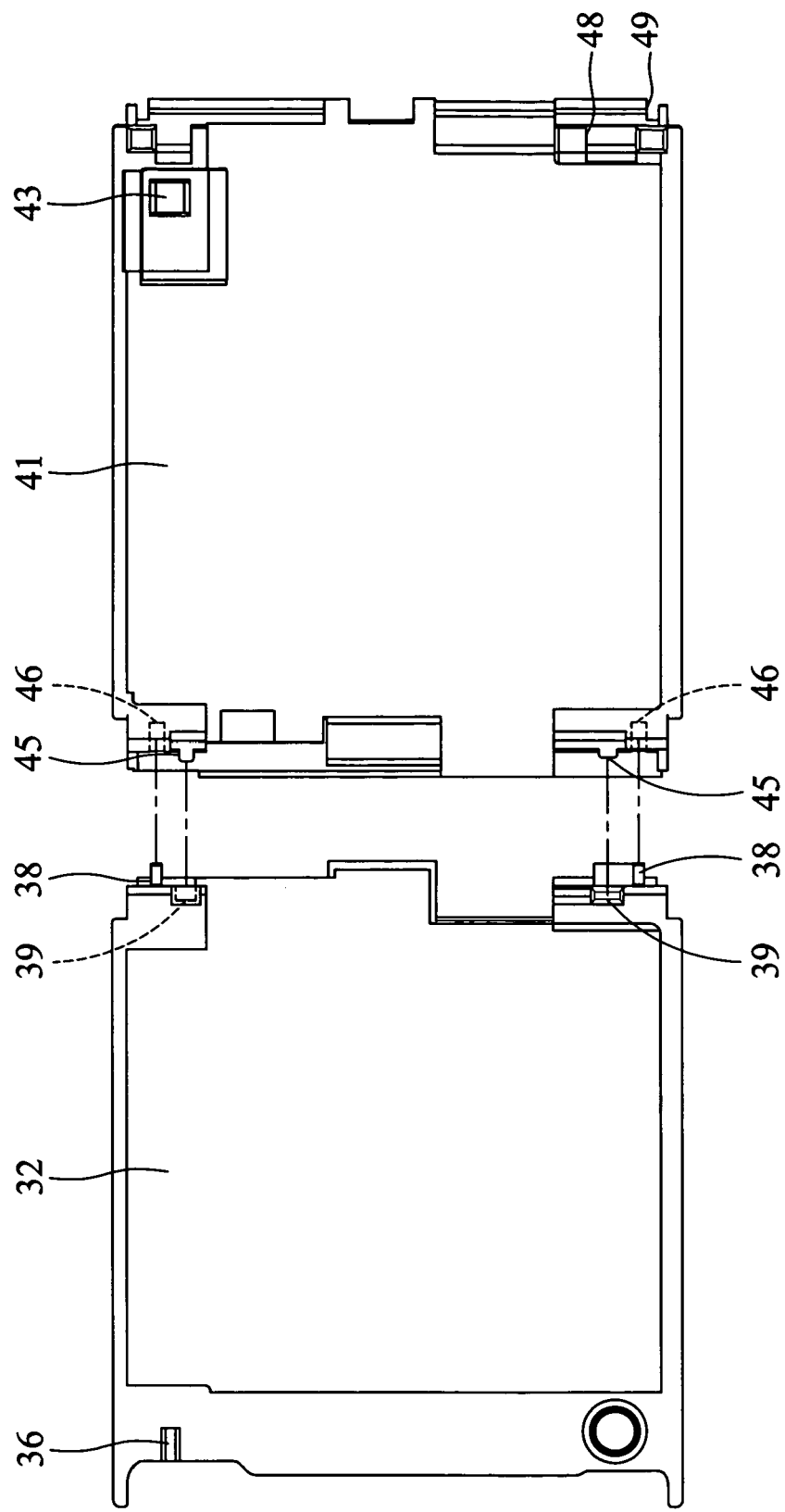
FIG. 5B is a top view of a first and a second housing of FIG. 4.

In FIG. 5B, the first housing 32 of the first key assembly 30 comprises a first protrusion 38 and a first recess 39, and the second key assembly 40 comprises a second protrusion 45 and a second recess 46. When the collapsible keyboard 100 is in the operating mode, the first protrusion 38 is engaged with the second recess 46 and the second protrusion 45 is engaged with the first recess 39. Due to the first protrusion 38 and the second protrusion 45 being alternately arranged, collision of the "D" key protruding from the first key assembly 30 with the second housing 41 can be prevented when the first key assembly 30 is rotated with respect to the second key assembly 40, i.e., the first and second key assemblies 30 and 40 are mutually moved. Even if the keyboard 100 is in the operating mode, the first and second key assemblies 30 and 40 can be substantially kept at the same level and stabilized.

Figure 5C:
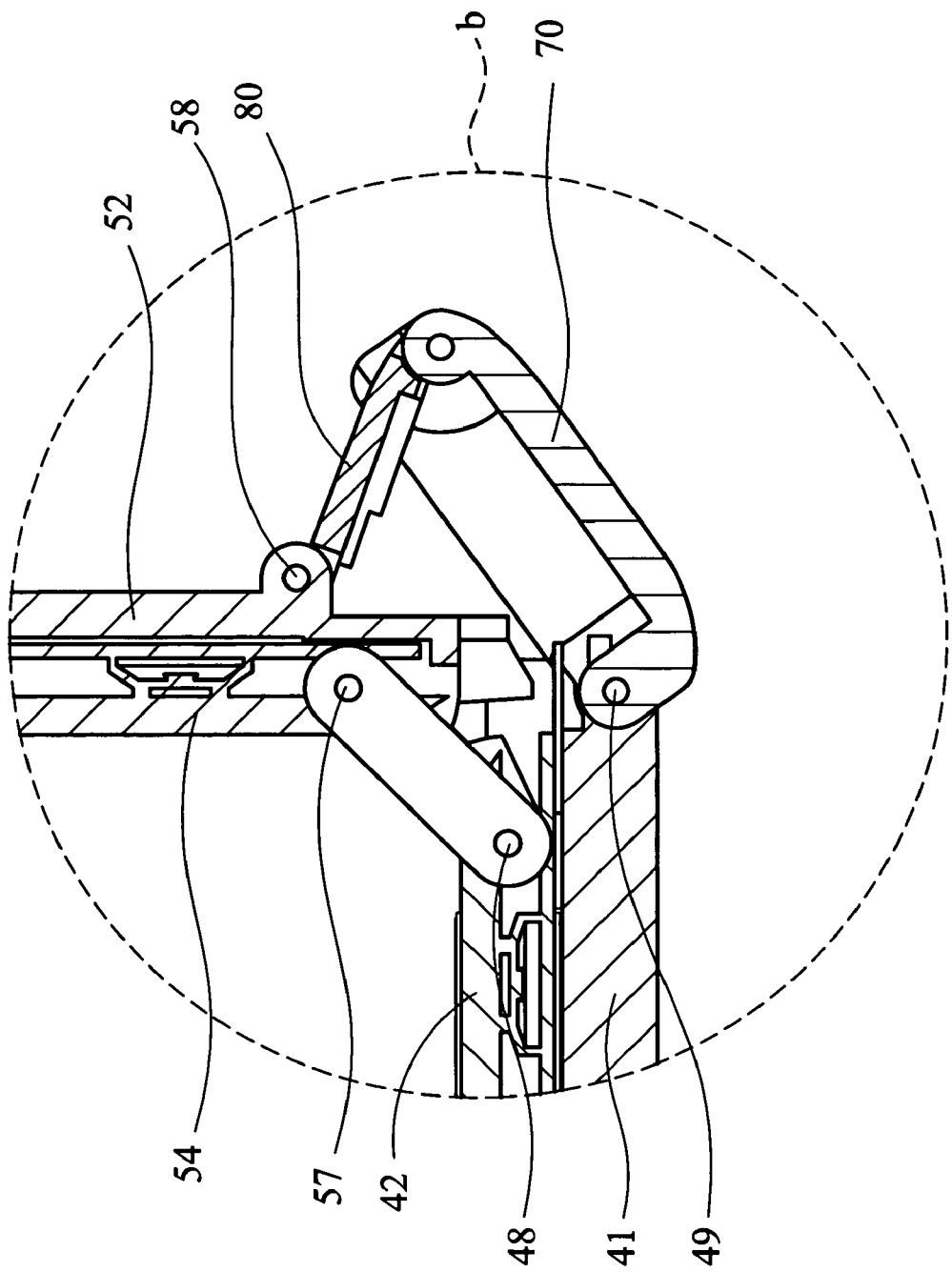
FIG. 5C is an enlarged view of a region (b) of FIG. 5A.

FIG. 5C is an enlarged view of a region b of FIG. 5A. In FIGS. 5A and 5C, the fifth shaft 57 is spaced from the edge of the third housing 52 by a suitable distance, thus an edge of the second housing 41 contacting the third housing 52 functions as a point of rotation. Based on the previously described five-linkage mechanism, in the process of lifting the second and third keys 42 and 54 projected from the second and third key assemblies 40 and 50, the second and third keys 42 and 54 can be prevented from colliding with the second housing 41 or the third housing 52.

Figure 6A:
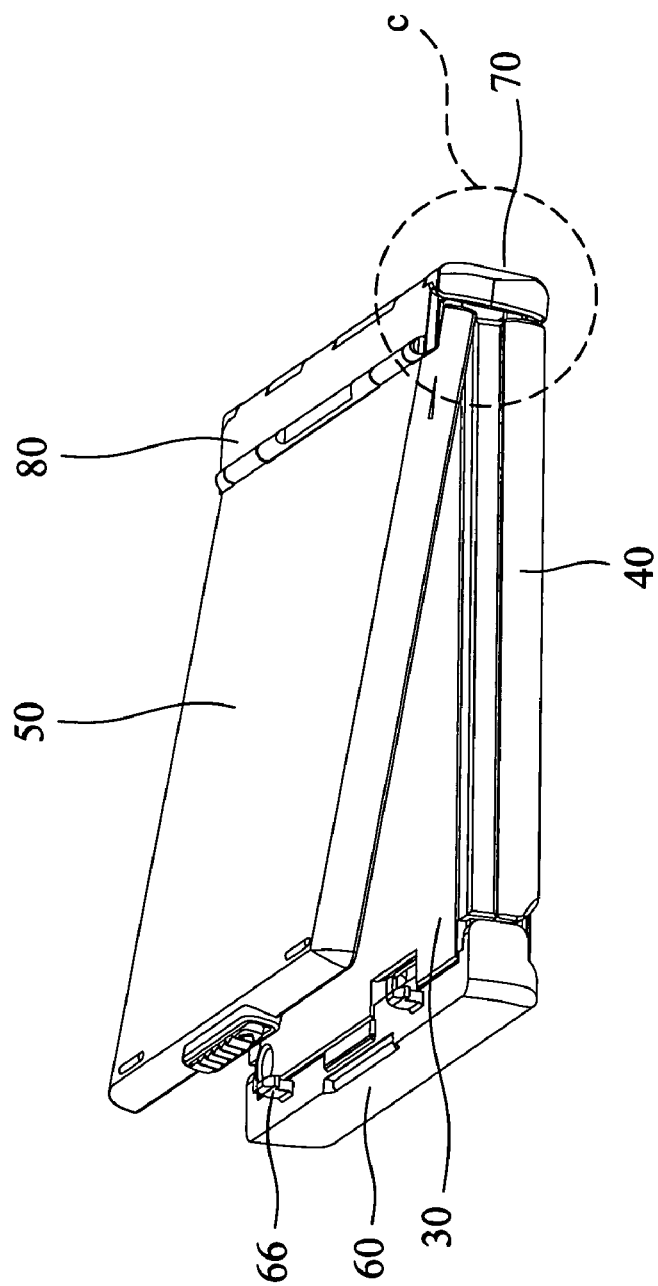
FIG. 6A is a perspective view of the collapsible keyboard of the invention in another collapsed mode.
Figure 7:
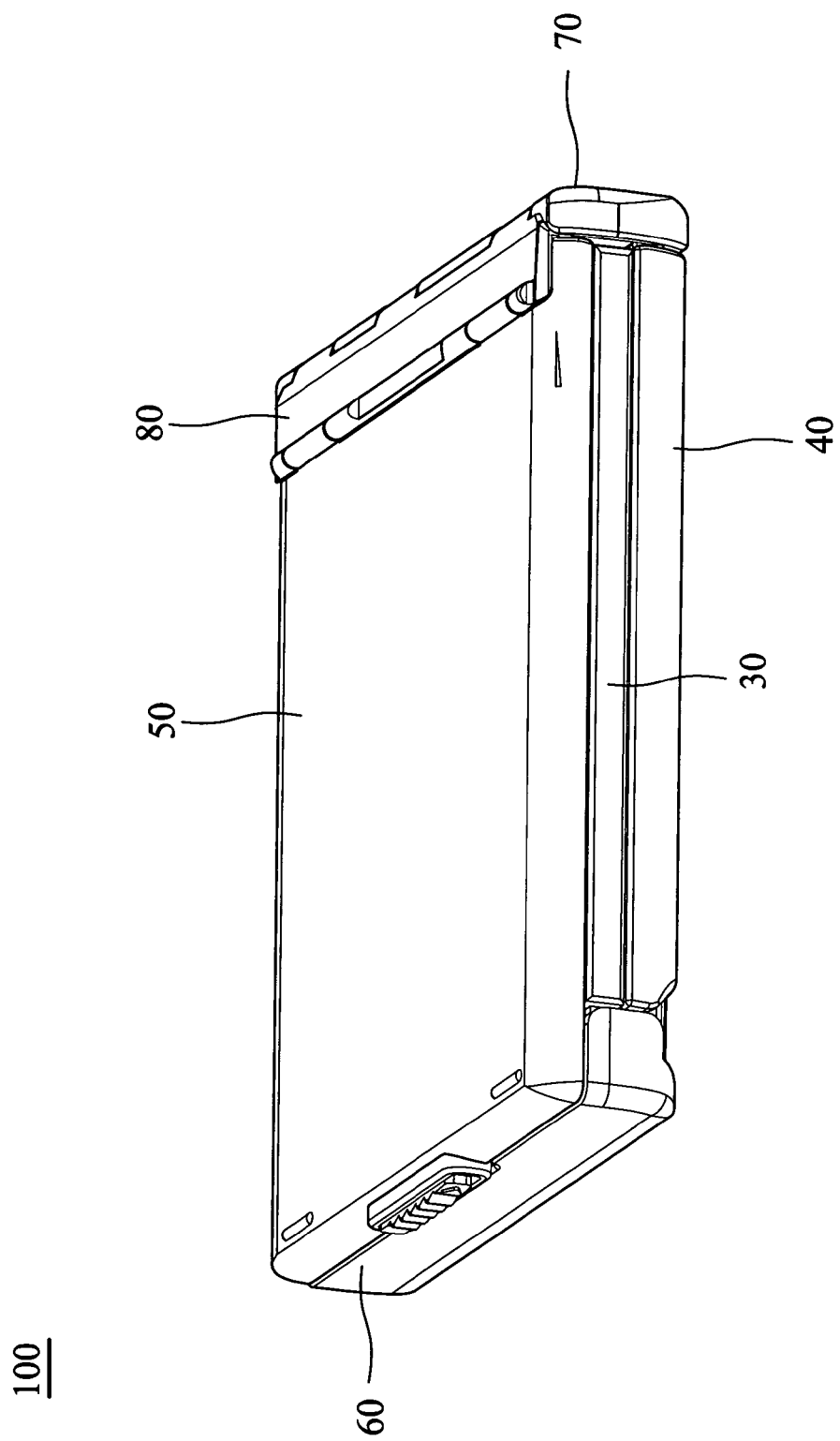
FIG. 7 is a perspective view of the collapsible keyboard of the invention in a collapsed mode.

FIG. 6A is a perspective view of the collapsible keyboard of the invention in another collapsed mode. Referring also to FIG. 5A, when the first key assembly 30 overlaps the second key assembly 40 and the third key assembly 50 then overlaps the back side of the first key assembly 30. The second connecting portion 56 (in FIG. 5A) of the third key assembly 50 can be locked by the second hook 66 of the connecting part 60, and thus the third key assembly 50 can be securely fixed. In the collapsed mode depicted in FIG. 7, the folded first key assembly 30 is located between the second and third key assemblies 40 and 50, and the first keys 34 of the first key assembly 30 and the third keys 54 of the third key assembly 50 face the second keys 42 of the second key assembly 40.

Figure 6B:
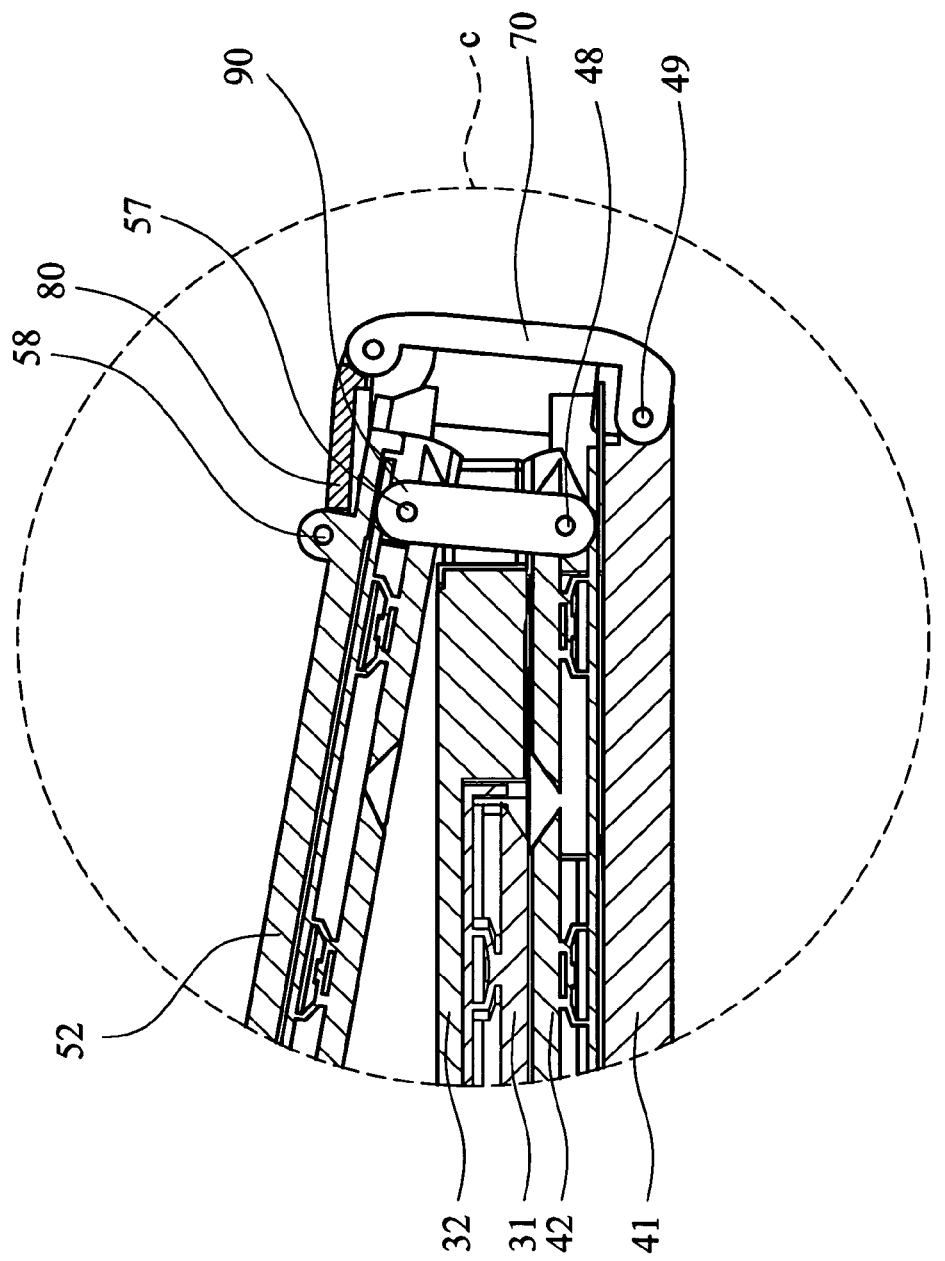
FIG. 6B is an enlarged sectional view of a region (c) of FIG. 6A.

FIG. 6B is an enlarged sectional view of a region c of FIG. 6A. The linkage 90 has a length substantially equal to the thickness of the keyboard 100. When the keyboard 100 is in the collapsed mode, the first side plate 70 is perpendicular to the second side plate 80, to hide the clearances between the first, second and third key assemblies 30, 40 and 50. Further, the keys can be protected form damage and accumulation of dust through the clearances by the first and second side plates 70 and 80.

The design of the first hook 36 and the first connecting portion 43 can be exchanged, as can the design of the second hook 66 and the second connecting portion 56, for securely fixing the first key assembly 30 and the third key assembly 50 together.

Except that the keyboard 100 is much thinner than the conventional collapsible keyboard, the only difference is that the collapsed keyboard 100 can be conveniently carried and stored. In particular, the keyboard 100 is collapsed by centrally folding its left and right key assemblies, i.e., the first and third key assemblies 30 and 50, to the center assembly, i.e., the second key assembly 40, to prevent dust accumulation and protect the keys from damage.

In FIG. 4A, due to the first key assembly 30 beign more narrow than the third key assembly 50, the "F", "J" keys and the space key 47 can be placed on the center of the keyboard 100, i.e., the second key assembly 40 of the keyboard 100, and the "F", "J" keys are substantially symmetrical with respect to the center of the space key 47. When operating the keyboard 100, a user's thumbs can be symmetrically positioned on the space key 47, and the left index finger can be positioned on the "F" key, and the right index finger can put on the "J" key, eliminating the need to divide the space key 47 into two sections located on different key assemblies, respectively.

While the invention has been described with respect to preferred embodiment, it is to be understood that the invention is not limited thereto, but, on the contrary, is intended to accommodate various modifications and equivalent arrangements included within the spirit and scope of the appended claims.

What is claimed is:

1. A collapsible keyboard, comprising:
   a first key assembly;
   a second key assembly rotatably connected to the first key assembly;
   a third key assembly rotatably connected to the second key assembly, wherein the first key assembly is located between the second and third key assemblies when the collapsible keyboard is in a collapsed mode, and the first key assembly, the second and third key assemblies are substantially located on the same level when the collapsible keyboard is in an operating mode;
   a linkage respectively pivoted to the second and third key assemblies;
   a first side plate pivoted to the second key assembly; and
   a second side plate respectively pivoted to the third key assembly and the first side plate.

2. The collapsible keyboard as claimed in claim 1, wherein the first key assembly is narrower than the third key assembly, and the first key assembly is on the left side of the second key assembly.

3. The collapsible keyboard as claimed in claim 1, wherein the first key assembly comprises a plurality of first keys and the second key assembly comprises a plurality of second keys and the third key assembly comprises a plurality of third keys, and the first keys and the third keys face the second keys when the collapsible keyboard is in the collapsed mode.

4. The collapsible keyboard as claimed in claim 3, wherein the first key assembly comprises a first edge irregularly formed by the first keys and the second key assembly comprises a second edge irregularly formed by the second keys and complementary to the second edge, wherein the first keys of the first edge alternately correspond to the second keys of the second edge.

5. The collapsible keyboard as claimed in claim 3, wherein the second key assembly comprises a third edge irregularly formed by the second keys and the third key assembly comprises a fourth edge irregularly formed by the third keys and complementary to the third edge, wherein the keys of the third edge alternately correspond to the third keys of the fourth edge.

6. The collapsible keyboard as claimed in claim 1, wherein the first key assembly comprises a first hook and the second key assembly comprises a first connecting portion, and the first hook is engaged with the first connecting portion for positioning the first key assembly when the collapsible keyboard is in the collapsed mode, and the collapsible keyboard further comprises a connecting part connecting to the first key assembly and the second key assembly, wherein the connecting part comprises a first rotation shaft pivoted to the first key assembly, a second shaft pivoted to the second key assembly and spaced apart from the first rotation shaft and a second hook and the third key assembly comprises a second connecting portion, wherein the second hook is engaged with the second connecting portion for positioning the third key assembly when the collapsible keyboard is in the collapsed mode.

7. The collapsible keyboard as claimed in claim 1, wherein the first key assembly comprises a first protrusion and a first recess and the second key assembly comprises a second protrusion and a second recess, and the first protrusion is engaged with the second recess and the second protrusion is engaged with the first recess when the collapsible keyboard is in the operating mode.

8. The collapsible keyboard as claimed in claim 1, wherein the second key assembly comprises a third shaft pivoted to an end of the linkage and a fourth shaft pivoted to the first side plate.

9. The collapsible keyboard as claimed in claim 8, wherein the third shaft and the fourth shaft are respectively located on different levels when the collapsible keyboard is in the operating mode.

10. The collapsible keyboard as claimed in claim 8, wherein the first side plate and the second side plate are substantially parallel when the collapsible keyboard is in the operating mode, and the second side plate is enclosed by the third key assembly and the first side plate.

11. The collapsible keyboard as claimed in claim 8, wherein the first side plate is substantially perpendicular to the second side plate when the collapsible keyboard is in the collapsed mode.

12. The collapsible keyboard as claimed in claim 1, wherein the third key assembly comprises a fifth shaft pivoted to an end of the linkage and a sixth shaft pivoted to the second side plate.

13. The collapsible keyboard as claimed in claim 12, wherein the fifth shaft and the sixth shaft are respectively located on different levels when the collapsible keyboard is in the operating mode.

14. A collapsible keyboard, comprising:
a first key assembly;
a second key assembly rotatably connected to the first key assembly;
a side plate pivoted to the second key assembly;
a connecting part connecting to the first key assembly and the second key assembly; and
a third key assembly rotatably connected to the second key assembly, wherein the first key assembly is narrower than the third key assembly, and the first key assembly is located between the second and third key assemblies when the collapsible keyboard is in a collapsed mode, wherein the collapsed first key assembly is circumferentially enclosed by the second and third key assemblies, the connecting part and the side plate.

15. The collapsible keyboard as claimed in claim 14, wherein the first key assembly is on the left side of the second key assembly.

16. The collapsible keyboard as claimed in claim 14, wherein the first key assembly comprises a plurality of first keys and the second key assembly comprises a plurality of second keys and the third key assembly comprises a plurality of third keys, and the first keys and the third keys face the second keys when the collapsible keyboard is in the collapsed mode.

17. The collapsible keyboard as claimed in claim 16, wherein the first key assembly comprises a first edge irregularly formed by the first keys and the second key assembly comprises a second edge irregularly formed by the second keys and complementary to the second edge, wherein the first keys of the first edge alternately correspond to the second keys of the second edge.

18. The collapsible keyboard as claimed in claim 16, wherein the second key assembly comprises a third edge irregularly formed by the second keys and the third key assembly comprises a fourth edge irregularly formed by the third keys and complementary to the third edge, wherein the keys of the third edge alternately correspond to the third keys of the fourth edge.

19. The collapsible keyboard as claimed in claim 14, wherein the second and third key assemblies are corresponded as well as the connecting part and the side plate are corresponded when the collapsible keyboard is in the collapsed mode.

* * * * *